H. P. BALL.
GRILL.
APPLICATION FILED SEPT. 22, 1914.
1,238,080.
Patented Aug. 28, 1917.
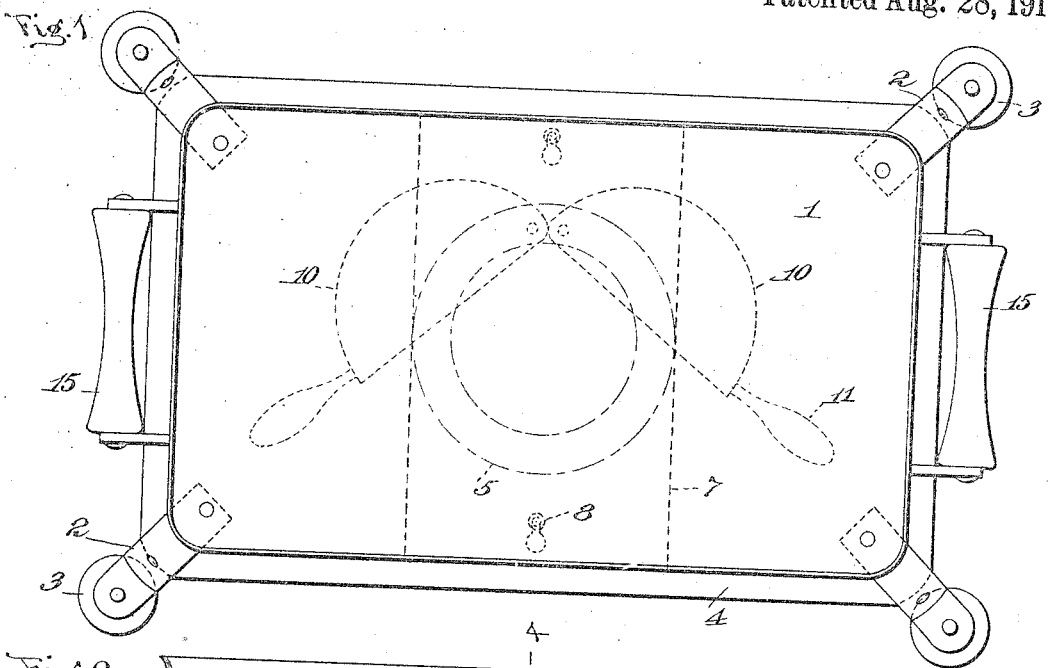
Fig. 1.
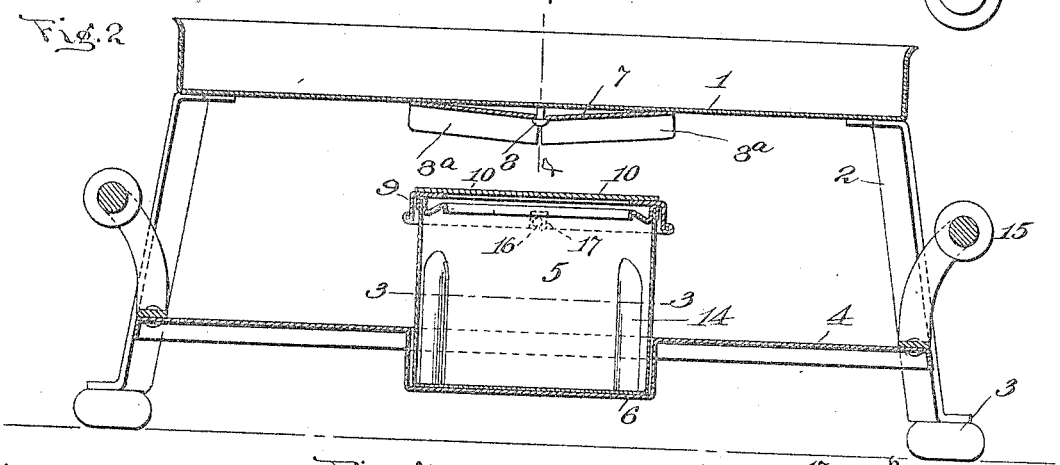
Fig. 2.
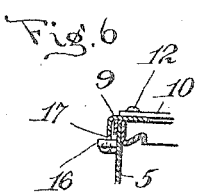
Fig. 6.
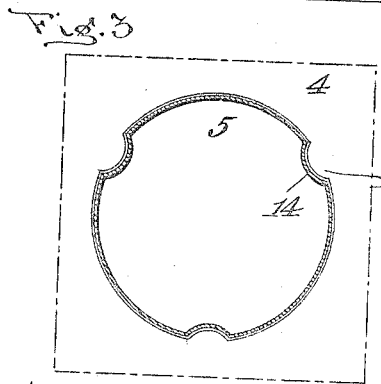
Fig. 3.
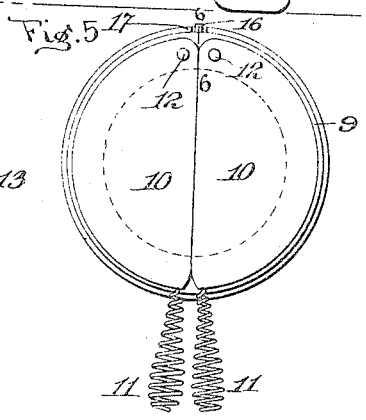
Fig. 5.
Witnesses:
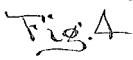
Fig. 4.
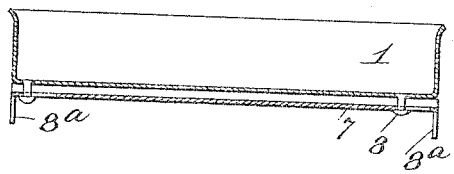
Inventor
Henry Price Ball
By Dyer & Taylor
Attorneys.

UNITED STATES PATENT OFFICE.

HENRY PRICE BALL, OF BROOKLYN, NEW YORK, ASSIGNOR TO S. STERNAU & COMPANY, OF BROOKLYN, NEW YORK, A COPARTNERSHIP COMPOSED OF SIGMUND STERNAU AND LIONEL STRASSBURGER.

GRILL.

1,238,080.   Specification of Letters Patent.   Patented Aug. 28, 1917.

Application filed September 22, 1914. Serial No. 862,884.

*To all whom it may concern:*

Be it known that I, HENRY PRICE BALL, a citizen of the United States, and a resident of the borough of Brooklyn, city of New York, county of Kings, and State of New York, have invented a certain new and useful Grill, of which the following is a specification.

This invention relates to grills heated by alcohol lamps and adapted for use upon the dining table for the cooking of eggs, chops, fish, etc.

The objects of the invention are:

First: To construct such a device so that it will constitute but few parts and may be readily cleaned after use.

Second: To render the device applicable to the usual dining table without need of a tray or mat to protect the latter from the heat of the lamp or the spilling of alcohol.

Third: To diffuse the flame under the pan so that an even amount of the heat will be secured to all parts of the pan.

Fourth: To utilize an oblong pan and so distribute the flame that all parts are evenly heated.

Fifth: To adjust the amount of flame under the different parts of the pan so that a higher heat may be secured at one end than at the other.

These and further objects will more fully appear from the following specification and accompanying drawings, considered together or separately.

In the drawings,

Figure 1 is a plan view of the device embodying my invention;

Fig. 2 is a sectional view thereof;

Fig. 3 is a sectional view on the line 3—3 of Fig. 2.

Fig. 4 is a section on the line 4—4 of Fig. 2;

Fig. 5 is a plan view of the lamp showing the arrangement of the dampers thereon; and Fig. 6 is a sectional view on the line 6—6 of Fig. 5.

In all views, like parts are designated by the same reference characters.

The pan 1 is made of suitable material, such as metal. The bottom of the pan is preferably made of thick enough material so that the contents will not be burned. The pan is supported upon legs 2 preferably riveted to the pan. Each leg is provided with a foot 3 of wood, fiber or some other suitable material so that the heat from the pan will not injure the supporting table. Connecting the legs is a fender or lamp support 4. This fender, which is preferably made of sheet metal, supports the lamp 5 preferably in the center thereof. The lamp 5 consists, in the embodiment chosen for illustration, of a can of sheet metal containing alcohol in solid form. Any other lamp may be employed than that illustrated, which is chosen for purposes of illustration. The lamp is supported within a cup or socket 6 carried by the fender. This fender not only keeps the heat from the lamp from striking downward and injuring the table, but also directs the heat upward. If it is made of polished metal, the effect will be increased. The fender also retains any alcohol which may leak from the lamp and thereby prevents injury to the table.

Associated with the bottom of the pan is a baffle 7. The purpose of this baffle is to prevent concentration of the flame to the center of the pan and to direct it toward the ends. Without the baffle an article filling the entire pan will be cooked only in the middle. With a baffle properly proportioned as to size and shape, a substantially equal amount of heat can be applied to the ends of the pan and to the middle. This baffle 7 is preferably made of a sheet of metal, creased down the center and slightly bent, as shown in Fig. 2. The baffle is held in place by means of headed pins 8 depending from the bottom of the pan and engaging with the keyed slots best shown in Figs. 1 and 4. The elasticity of the plate will hold it in place, it being understood that it is naturally bent to a somewhat greater angle than it assumes when in place so that the sides of the openings are engaged with the heads of the pins.

For the purpose of diverting the flame toward the ends of the pan and allowing a pan of an oblong shape to be used, I prefer to provide the baffle 8 with side flanges 8ª, as shown. This makes it possible to employ an oblong pan which has a better appearance than a square pan and at the same time allows the extreme ends of the pan to be used for cooking as well as the center.

For the purpose of controlling and regulating the flame of the lamp, I utilize the following devices:

The lamp 5 is provided with a ring 9, this ring having an opening in the center through which the flame will pass. To this ring I attach two dampers or covers, 10, 10. These are provided with handles, 11, 11 and are secured to the ring by means of pivots 12, 12. Each damper may be opened or closed independently of the other by manipulating either of the handles. To prevent the ring from turning on the lamp, the latter is provided with a pin 16 which engages with a notch 17 on the ring 9, see Fig. 6.

In order to prevent the lamp from turning in the cup 6 when only one or the other of the dampers is manipulated, I provide projecting ears 13 on the sides of the cup. These projecting ears engage with the flutes 14, 14 on the sides of the lamp. These projecting ears and flutes insure a proper alinement of the lamp so that the handles 11, 11 will extend in the proper direction. They also prevent rotation of the lamp and insure its fixed position so that the directions for the operation of the lamp, printed thereon, will not be hidden from view by rotation of the lamp.

In order to lift the device, handles 15, 15 are provided.

In accordance with the provisions of the patent statutes, I have described the principles of my invention together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

1. A grill having in combination a pan, a lamp support below the pan, and a removable baffle plate, said plate being creased along its center and having keyed openings at this point, there being headed pins on the pan engaging with the openings.

2. A grill having in combination an oblong pan and a lamp support below the center thereof, and a removable baffle plate carried by the pan, said plate having a depressed center and raised sides, and with depending edges to direct the flame toward the ends of the pan.

This specification signed and witnessed Sept. 18, 1914.

HENRY PRICE BALL.

Witnesses:
D. HESSLER,
S. J. BECKER.